US009518490B2

(12) United States Patent
Arai et al.

(10) Patent No.: US 9,518,490 B2
(45) Date of Patent: Dec. 13, 2016

(54) EXHAUST GAS PROCESSING DEVICE FOR ENGINE

(71) Applicant: KUBOTA Corporation, Osaka-shi, Osaka (JP)

(72) Inventors: Katsuaki Arai, Osaka (JP); Takashi Onishi, Osaka (JP); Yoshikazu Takemoto, Osaka (JP); Tomoya Akitomo, Osaka (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 106 days.

(21) Appl. No.: 14/641,577

(22) Filed: Mar. 9, 2015

(65) Prior Publication Data

US 2015/0275729 A1 Oct. 1, 2015

(30) Foreign Application Priority Data

Mar. 28, 2014 (JP) .................................. 2014-067585

(51) Int. Cl.
*B01D 50/00* (2006.01)
*F01N 3/20* (2006.01)
(Continued)

(52) U.S. Cl.
CPC ........... *F01N 3/2006* (2013.01); *F01N 3/0256* (2013.01); *F01N 3/035* (2013.01); *F01N 3/36* (2013.01);
(Continued)

(58) Field of Classification Search
CPC .......... F01N 3/023; F01N 3/103; F01N 3/035; F01N 13/008; F01N 3/2006; F01N 2240/16; F01N 2610/04
(Continued)

(56) References Cited

U.S. PATENT DOCUMENTS 7,814,746 B2 * 10/2010 Aketa ..................... F01N 3/025
422/173
7,908,847 B2 * 3/2011 Crawley ................. F01N 3/025
431/12
(Continued)

FOREIGN PATENT DOCUMENTS

JP 2012-188972 A 10/2012

*Primary Examiner* — Tom P Duong
(74) *Attorney, Agent, or Firm* — Panitch Schwarze Belisario & Nadel LLP

(57) ABSTRACT

An exhaust gas processing device for an engine, capable of securely warming a combustion catalyst, is provided. A combustion catalyst burning gas is produced when a warming end condition for the combustion catalyst is established, which signifies the establishment of either one of a first condition or a second condition. In the first condition, an inlet temperature of a combustion catalyst is equal to or higher than an activation requirement temperature of the combustion catalyst, and further, an outlet temperature of the combustion catalyst is equal to or higher than an activation confirmation temperature of the combustion catalyst in excess of the inlet temperature of the combustion catalyst. In the second condition, the outlet temperature of the combustion catalyst exceeds a warming confirmation temperature of the combustion catalyst that is set to be higher as an engine speed is lower, for a predetermined period of time.

9 Claims, 3 Drawing Sheets

(51) Int. Cl.
> F01N 3/36 (2006.01)
> F01N 3/38 (2006.01)
> F01N 9/00 (2006.01)
> F01N 13/00 (2010.01)
> F01N 3/025 (2006.01)
> F01N 3/035 (2006.01)
> F01N 3/10 (2006.01)

(52) U.S. Cl.
> CPC ............... F01N 3/38 (2013.01); F01N 9/002 (2013.01); F01N 13/008 (2013.01); *F01N 3/103* (2013.01); *F01N 13/0097* (2014.06); *F01N 2240/14* (2013.01); *F01N 2240/16* (2013.01); *F01N 2560/06* (2013.01); *F01N 2560/08* (2013.01); *F01N 2560/14* (2013.01); *F01N 2610/04* (2013.01); *F01N 2610/107* (2013.01); *Y02T 10/26* (2013.01); *Y02T 10/47* (2013.01)

(58) Field of Classification Search
> USPC ........... 422/168; 60/286, 289, 297, 303, 300
> See application file for complete search history.

(56) References Cited

U.S. PATENT DOCUMENTS

| | | | |
|---|---|---|---|
| 8,353,153 B2* | 1/2013 | Kotrba | F01N 3/0238 60/286 |
| 8,407,989 B2* | 4/2013 | Leustek | 60/274 |
| 8,464,516 B2* | 6/2013 | Bell | F01N 3/025 60/286 |
| 2009/0180937 A1* | 7/2009 | Nohl | F01N 3/025 422/176 |

* cited by examiner

EXHAUST GAS PROCESSING DEVICE FOR ENGINE

BACKGROUND OF THE INVENTION (1) Field of the Invention

The present invention relates to an exhaust gas processing device for an engine.

(2) Description of Related Art

<<Problems>>

The promotion of exhaust gas processing at an exhaust gas processing unit sometimes becomes insufficient.

In a conventional exhaust gas processing device, exhaust gas processing is accidentally performed at an exhaust gas processing unit in the state in which a combustion catalyst is insufficiently warmed. In this case, the combustion catalyst is not activated, thereby preventing catalyst combustion. Consequently, the promotion of the exhaust gas processing at the exhaust gas processing unit sometimes becomes insufficient.

SUMMARY OF THE INVENTION

An object of the present invention is to provide an exhaust gas processing device for an engine capable of securely warming a combustion catalyst.

Means for Solving the Problem to be Solved

An invention specifying matter according to the present invention is as follows.

An exhaust gas processing device for an engine includes a combustible gas producer, a combustion catalyst, an exhaust processing unit, and a control unit. The exhaust gas processing device is configured such that a combustion catalyst burning gas is produced by the combustible gas producer under the control of the control unit, the resultant combustion catalyst burning gas is mixed with an exhaust gas passing an engine exhaust gas channel and burned with the combustion catalyst, and then, the exhaust gas whose temperature is increased by catalyst combustion is supplied to the exhaust processing unit. The control unit allows the combustible gas producer to produce a combustion catalyst warming gas before the combustion catalyst burning gas is produced, the resultant combustion catalyst warming gas is mixed with the exhaust gas passing the engine exhaust gas channel and ignited by an igniter disposed upstream of the combustion catalyst that is thus warmed with the exhaust gas whose temperature is increased by flame combustion. The combustion catalyst burning gas is produced in the case where a warming end condition for the combustion catalyst is established. The establishment of the warming end condition for the combustion catalyst signifies the establishment of either one of a first condition or a second condition: the first condition in which an inlet temperature of the combustion catalyst is equal to or higher than an activation requirement temperature of the combustion catalyst, and further, an outlet temperature of the combustion catalyst is equal to or higher than an activation confirmation temperature of the combustion catalyst in excess of the inlet temperature of the combustion catalyst; and the second condition in which the outlet temperature of the combustion catalyst exceeds a warming confirmation temperature of the combustion catalyst that is set to be higher as an engine speed is lower, for a predetermined period of time.

Effects of the Invention

The present invention produces the following effects.

<<Effects>>

The combustion catalyst can be securely warmed.

The combustion catalyst is activated under the first condition in which the activation of the combustion catalyst can be directly confirmed based on the inlet temperature and outlet temperature of the combustion catalyst or under the second condition in which the activation temperature of the combustion catalyst can be securely ensured based on the outlet temperature of the combustion catalyst according to the engine speed, thus securely warming the combustion catalyst.

DETAILED DESCRIPTION OF PREFERRED EMBODIMENTS

Figure 1:
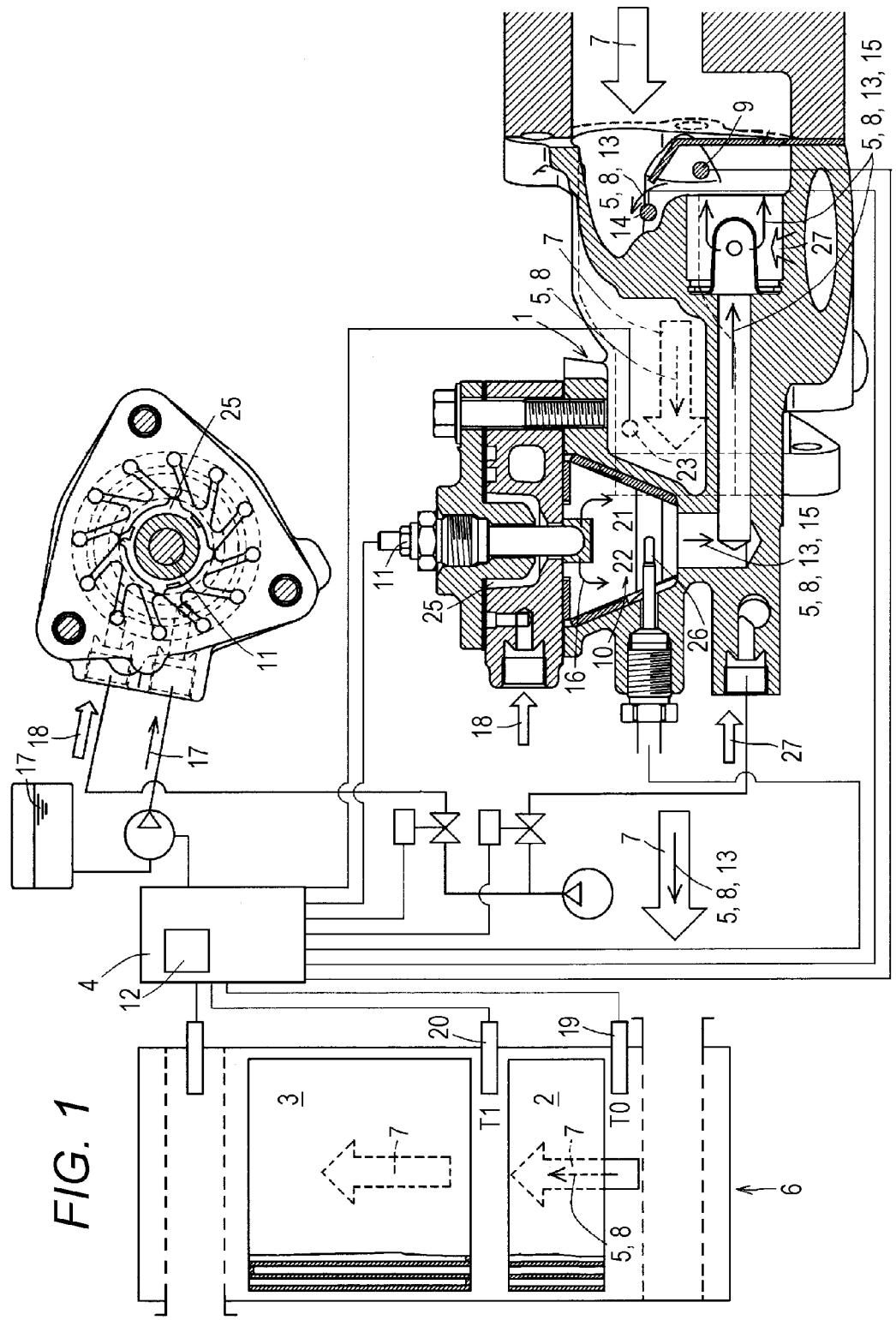
FIG. 1 is a schematic view showing an exhaust gas processing device for an engine according to an embodiment of the present invention.
Figure 2:
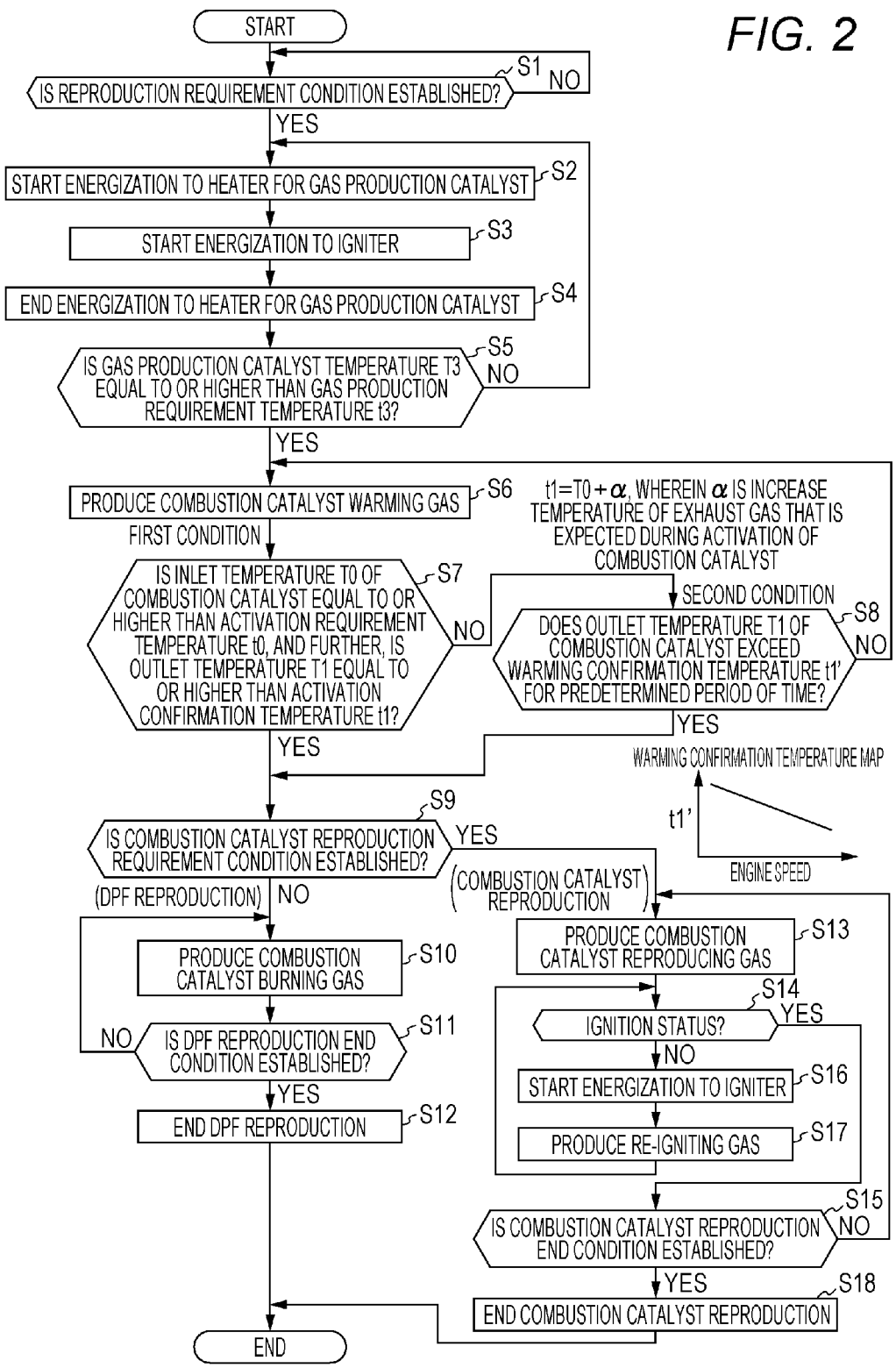
FIG. 2 is a flowchart illustrating processing by the exhaust gas processing device shown in FIG. 1.
Figure 3:
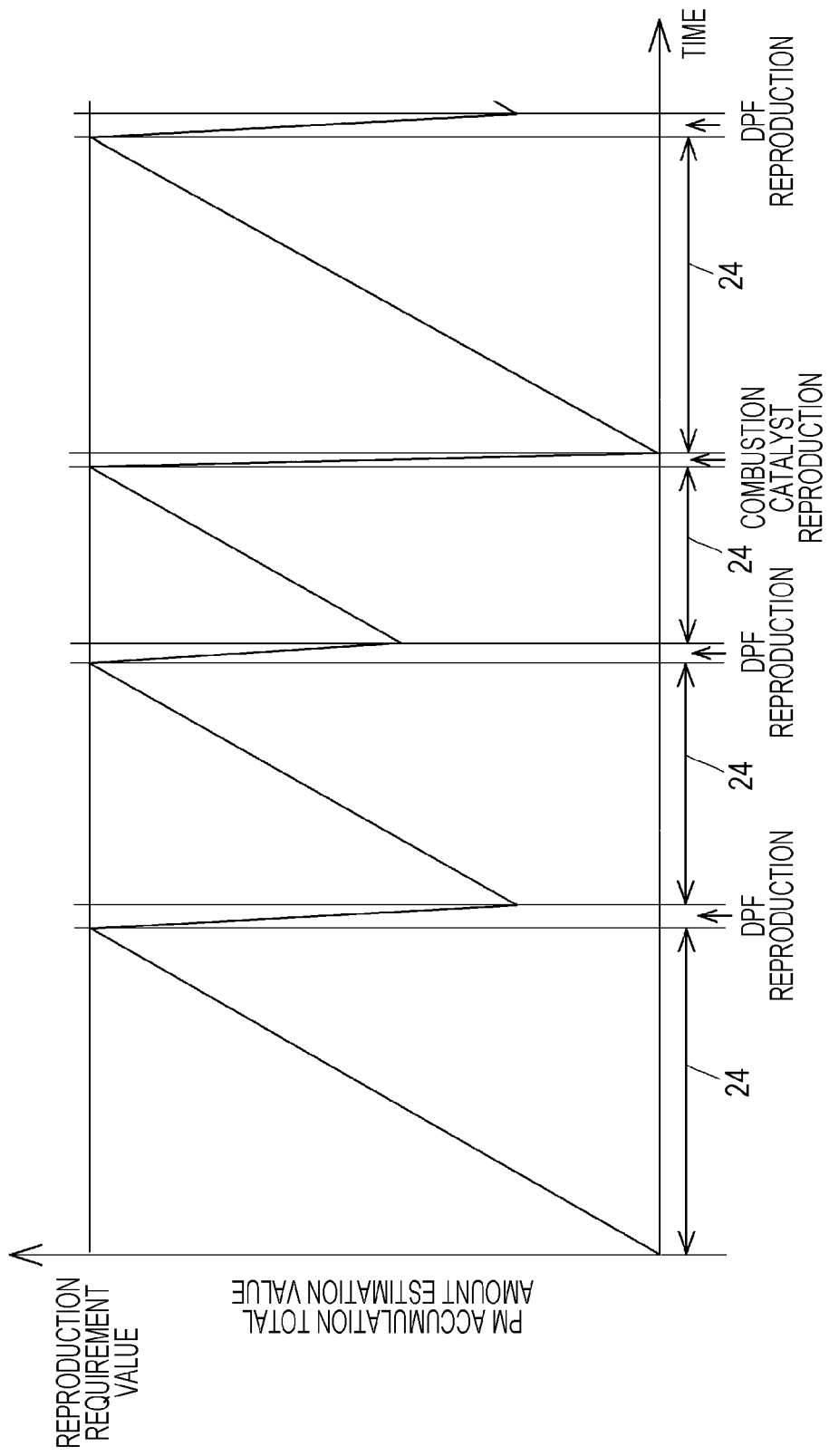
FIG. 3 is a timing chart illustrating DPF reproduction and combustion catalyst reproduction by the exhaust gas processing device shown in FIG. 1.

FIGS. 1 to 3 illustrate an exhaust gas processing device for an engine according to an embodiment of the present invention. A description will be given of an exhaust gas processing device for a diesel engine in the present embodiment.

The outline of the exhaust gas processing device is as follows. As shown in FIG. 1, the exhaust gas processing device includes a combustible gas producer (1), a combustion catalyst (2), an exhaust gas processing unit (3), and a control unit (4).

As shown in FIGS. 1 and 2, in the exhaust gas processing device, the combustible gas producer (1) produces (S10) a combustion catalyst burning gas (5) under the control of the control unit (4), and then, the combustion catalyst burning gas (5) is mixed with exhaust gas (7) passing an engine exhaust gas channel (6). Thereafter, the mixture gas is subjected to catalyst combustion with the combustion catalyst (2). And then, the exhaust gas (7) whose temperature is increased by the catalyst combustion is supplied to the exhaust gas processing unit (3).

As shown in FIG. 1, the combustible gas producer (1) is adapted to produce a combustible gas such as the combustion catalyst burning gas (5) from an air-fuel mixture (16) by a catalytic reaction with a gas production catalyst (10).

The gas production catalyst (10) is contained inside of the combustible gas producer (1). Above the gas production catalyst (10) is provided an air-fuel mixture chamber (25). At the center above the gas production catalyst (10) is formed a gas mixture inlet (21) that is recessed downward. Liquid fuel (17) and air (18) are supplied to the air-fuel mixture chamber (25). The liquid fuel (17) and the air (18) are mixed with each other to produce the air-fuel mixture (16), to be thus supplied to the gas production catalyst (10) from the gas mixture inlet (21). The gas mixture inlet (21) contains a gas production starting catalyst (22) therein. A heater (11) is inserted into the gas production starting catalyst (22). A temperature sensor (26) for the gas production catalyst (10) is inserted into the gas production catalyst (10).

The gas production catalyst (10) is obtained by weaving iron chrome wires that bear rhodium catalytic components thereon. The gas production starting catalyst (22) is made of an alumina fiber mat that bears a rhodium catalytic component thereon. The gas production starting catalyst (22) has the higher holdability of the liquid fuel (17) in comparison with the gas production catalyst (10).

Light oil is used as the liquid fuel (17).

The combustion catalyst (2) is a DOC that abbreviates a diesel oxidation catalyst.

The exhaust gas processing unit (3) is a DPF that abbreviates a diesel particulate filter for capturing PM contained in the exhaust gas (7).

As the exhaust gas processing unit (3) may be used an exhaust gas purifying catalyst (such as an SCR catalyst or a NOx occlusion catalyst) in addition to the DPF. The SCR catalyst abbreviates selective catalytic reduction catalyst, and further, NOx abbreviates nitrogen oxides.

The control unit (4) is an engine ECU or a microcomputer. ECU abbreviates an electronic control unit.

The feature of the exhaust gas processing device is as follows.

As shown in FIGS. 1 and 2, a combustion catalyst warming gas (8) is produced (S6) at the combustible gas producer (1) by the control unit (4) before the combustion catalyst burning gas (5) is produced (S10), and then, the combustion catalyst warming gas (8) is mixed with the exhaust gas (7) passing the engine exhaust gas channel (6). Thereafter, the mixture gas is ignited by an igniter (9) disposed upstream of the combustion catalyst (2), and thus, the combustion catalyst (2) is warmed with the exhaust gas (7) whose temperature is increased by flame combustion.

In the case where the warming end condition for the combustion catalyst (2) is established, the combustion catalyst burning gas (5) is produced (S10).

The igniter (9) is a glow plug. A spark plug may also be used as the igniter (9).

In addition to the combustion catalyst burning gas (5), the combustion catalyst warming gas (8), described later, a combustion catalyst reproducing gas (13), and a re-igniting gas (15) are mixed with a secondary air (27) upstream of the igniter (9).

The case where the warming end condition for the combustion catalyst (2) is established is as follows.

As shown in FIGS. 1 and 2, the establishment of the warming end condition for the combustion catalyst (2) signifies the establishment of either one of a first condition or a second condition: the first condition in which an inlet temperature (T0) of the combustion catalyst (2) is equal to or higher than an activation requirement temperature (t0) of the combustion catalyst (2), and further, an outlet temperature (T1) of the combustion catalyst (2) is equal to or higher than an activation confirmation temperature (t1) of the combustion catalyst (2) in excess of the inlet temperature (T0) of the combustion catalyst (2); and the second condition in which the outlet temperature (T1) of the combustion catalyst (2) exceeds a warming confirmation temperature (t1') of the combustion catalyst (2) that is set to be higher as an engine speed is lower for a predetermined period of time.

In this manner, the combustion catalyst (2) is activated under the first condition in which the activation of the combustion catalyst (2) can be directly confirmed based on the inlet temperature (T0) and outlet temperature (T1) of the combustion catalyst (2) and under the second condition in which the activation temperature of the combustion catalyst (2) can be securely ensured based on the outlet temperature (T1) of the combustion catalyst (2) according to the engine speed. Consequently, the combustion catalyst (2) can be securely warmed.

As shown in FIG. 1, the inlet temperature (T0) of the combustion catalyst (2) is detected by an exhaust gas temperature sensor (19) disposed at the inlet of the combustion catalyst (2). The outlet temperature (T1) of the combustion catalyst (2) is detected by another exhaust gas temperature sensor (20) disposed at the outlet of the combustion catalyst (2). The activation requirement temperature (t0) is a low limit temperature at which the combustion catalyst (2) is activated so that the combustion catalyst burning gas (5) is catalytically burned. The activation confirmation temperature (t1) is a low limit temperature at an outlet in the case where the combustion catalyst (2) is activated, that is, a temperature obtained by adding an activation increase temperature ($\alpha$) to the inlet temperature (T0) of the combustion catalyst (2). The activation increase temperature ($\alpha$) is an exhaust gas increase temperature expected by the catalyst combustion of the combustion catalyst warming gas (8) during the activation of the combustion catalyst (2).

The warming confirmation temperature (t1') is a low limit temperature at the outlet of the combustion catalyst (2) in the case of the activation of the combustion catalyst (2) irrespective of the inlet temperature (T0) of the combustion catalyst (2). The warming confirmation temperature (t1') is set to become higher as the engine speed is lower. As the engine speed becomes low, a fuel injection quantity per unit period of time is decreased, thereby decreasing the temperature of the exhaust gas (7).

Therefore, heat accumulated in the combustion catalyst (2) is dissipated. In view of this, the warming confirmation temperature (t1') is set to be higher. Thus, even if the heat is dissipated, the temperature of the combustion catalyst (2) can be securely maintained at the activation temperature. The warming confirmation temperature (t1') according to the engine speed is obtained by experiments, and thus, is mapped. The warming confirmation temperature (t1') is set to be higher than the activation requirement temperature (t0).

As shown in FIGS. 1 and 2, a target reaction temperature of the gas production catalyst (10) at the combustible gas producer (1) is set to be higher in the case where the combustion catalyst warming gas (8) is produced (S6) than that in the case where the combustion catalyst burning gas (5) is produced (S10). Therefore, the ignition quality of the combustion catalyst warming gas (8) is configured in such a manner as to be enhanced more than that of the combustion catalyst burning gas (5). Thus, it is possible to suppress a failure of the ignition of the combustion catalyst warming gas (8) so as to securely warm the combustion catalyst (2).

When the target reaction temperature of the gas production catalyst (10) at the combustible gas producer (1) is set to be higher, a combustible gas is turned into low molecules by thermal decomposition, thus enhancing the ignition quality.

In order to increase the reaction temperature of the gas production catalyst (10), the mixture ratio of the air-fuel mixture (16) should be controlled so that the ratio of air becomes higher than that of fuel.

As shown in FIGS. 1 and 2, the combustible gas producer (1) is provided with the heater (11). Before the combustion catalyst warming gas (8) is produced (S6) with the gas production catalyst (10), the control unit (4) warms the gas production catalyst (10) with the heat generated by the heater (11).

As illustrated in FIG. 2, after a lapse of a predetermined period of time since the energization to the heater (11) is started (S2), the energization to the heater (11) is ended (S4). In the meantime, the control unit (4) starts (S3) the energization to the igniter (9) before the end (S4), so that the igniter (9) is pre-heated before the combustion catalyst warming gas (8) is produced (S6).

In this manner, it is possible to suppress a failure of the ignition of the combustion catalyst warming gas (8) so as to securely warm the combustion catalyst (2).

As shown in FIG. 1, there is provided a PM accumulation amount estimator (12) for the combustion catalyst (2).

As shown in FIGS. 1 and 2, in the case where a predetermined combustion catalyst reproduction requirement condition is satisfied based on a PM accumulation amount estimation value of the combustion catalyst (2), the control unit (4) allows the combustible gas producer (1) to produce (S13) the combustion catalyst reproducing gas (13) that is mixed with the exhaust gas (7) passing the engine exhaust gas channel (6), to be ignited by the igniter (9). The PM accumulated on the combustion catalyst (2) is burned and removed with the exhaust gas (7) whose temperature is increased by the flame combustion, thus reproducing the combustion catalyst (2).

In this manner, even if the PM is accumulated on the combustion catalyst (2), it is possible to recover the function of the combustion catalyst (2). The PM accumulation amount estimator (12) is an arithmetic section of the engine ECU.

As shown in FIG. 1, there is provided an ignition status detector (14) for the igniter (9).

As shown in FIGS. 1 and 2, in the case where the ignition status detector (14) detects that the combustion catalyst reproducing gas (13) is not ignited, the control unit (4) allows the combustible gas producer (1) to produce (S17) the re-igniting gas (15). In the case where the re-igniting gas (15) is produced, a target reaction temperature of the gas production catalyst (10) in the combustible gas producer (1) is set to be higher than that in the case where the combustion catalyst reproducing gas (13) is produced (S13), thus enhancing the ignition quality of the re-igniting gas (15) more than that of the combustion catalyst reproducing gas (13). In this manner, it is possible to suppress a failure of the ignition of the re-igniting gas (15) so as to securely recover the function of the combustion catalyst (2) by reproducing the combustion catalyst (2). The ignition status detector (14) is a temperature sensor.

When the target reaction temperature of the gas production catalyst (10) in the combustible gas producer (1) is set to be higher, the combustible gas is turned into low molecules by thermal decomposition, thus enhancing the ignition quality.

In order to increase the reaction temperature of the gas production catalyst (10), the mixture ratio of the air-fuel mixture (16) should be controlled so that the ratio of air becomes higher than that of fuel.

The flow of processing in the exhaust gas processing device is as follows.

In step (S1), it is determined whether or not the reproduction requirement condition is established. If the determination is affirmative, the process proceeds to step (S2). If the determination is negative, the determination in step (S1) is repeated.

When the reproduction requirement condition is established, a PM accumulation total amount estimation value reaches a reproduction necessity value, as illustrated in FIG. 3. When the reproduction requirement condition is established, it is not determined which of the DPF and the combustion catalyst (2) is required to be reproduced. This determination will be made in step (S9) later.

The PM accumulation total amount estimation value is estimated by the PM accumulation amount estimator (12) based on the exhaust gas pressure upstream of the combustion catalyst (2). The exhaust gas pressure is detected by an exhaust gas pressure sensor (23). The PM accumulation amount estimator (12) is an arithmetic processor in the control unit (4).

In step (S2), the energization to the heater (11) for the gas production catalyst (10) is started, and then, the process proceeds to step (S3).

In step (S3), the energization to the igniter (9) is started, and then, the process proceeds to step (S4).

In step (S4), the energization to the heater (11) for the gas production catalyst (10) is ended based on the fact that a predetermined period of time elapses since the energization is started in step (S2), and then, the process proceeds to step (S5).

In step (S5), it is determined whether or not a gas production catalyst temperature (T3) is equal to or higher than a gas production requirement temperature (t3). If the determination is affirmative, the warming is ended, and then, the process proceeds to step (S6). In contrast, if the determination is negative, the process returns to step (S2).

Incidentally, after the energization to the igniter (9) in step (S3) is started, in the case where the ignition status detector (14) detects the ignition of the combustion catalyst warming gas (8), the energization to the igniter (9) may be ended. Without the heat generation at the igniter (9), the flame combustion of the combustion catalyst warming gas (8) is continued. When the combustion flame is brought into contact with the combustion catalyst burning gas (5) having a low ignition quality produced in step (S10), described later, the combustion flame is blown out.

In step (S6), the combustion catalyst warming gas (8) is produced, and then, the process proceeds to step (S7).

In step (S7), it is determined whether or not the first condition of the warming end condition of the combustion catalyst (2) is established in which the inlet temperature (T0) of the combustion catalyst (2) is equal to or higher than the activation requirement temperature (t0), and further, the outlet temperature (T1) of the combustion catalyst (2) is equal to or higher than the activation confirmation temperature (t1). If the determination is affirmative, the process proceeds to step (S9).

In contrast, if the determination in step (S7) is negative, the process proceeds to step (S8). Thereafter, it is determined whether or not the second condition of the warming end condition of the combustion catalyst (2) is established in which the outlet temperature (T1) of the combustion catalyst (2) exceeds the warming confirmation temperature (t1') for a predetermined period of time. If the determination is affirmative, the process proceeds to step (S9). In contrast, if the determination is negative, the process returns to step (S6).

In step (S9), it is determined whether or not the reproduction requirement condition of the combustion catalyst (2) is established. If the determination is affirmative, the process proceeds to step (S10). Thereafter, the DPF serving as the exhaust gas processing unit (3) is started to be reproduced. In contrast, if the determination is negative, the process proceeds to step (S13) in which the combustion catalyst (2) is started to be reproduced.

As illustrated in FIG. 3, the reproduction requirement condition of the combustion catalyst (2) is established when an interval (24) after the previous reproduction end until the establishment of the current reproduction requirement condition is shorter than a predetermined period of time.

Substantially all of the PM accumulated on the DPF is removed by one DPF reproducing or one combustion catalyst reproducing. However, the PM accumulated on the combustion catalyst (2) cannot be removed by the DPF reproducing a plurality of times, and thus, is gradually accumulated. Consequently, in the case where the interval (24) is shorter than the predetermined period of time, it can be estimated that a predetermined quantity of PM required for the reproduction of the combustion catalyst (2) is accumulated.

In step (S10), the combustion catalyst burning gas (5) is produced, and then, the process proceeds to step (S11). In step (S11), it is determined whether or not the DPF reproduction end condition is established. If the determination is affirmative, the process proceeds to step (S12).

The DPF reproduction end condition is established in the case where a DPF inlet temperature (i.e., a combustion catalyst outlet temperature) is equal to or higher than a predetermined value for a predetermined period of time.

In step (S12), the DPF reproduction is ended, and thus, the process comes to an end.

The DPF reproduction is ended by stopping the production of the combustion catalyst burning gas (5).

In step (S13), the combustion catalyst reproducing gas (13) is produced, and then, the process proceeds to step (S14).

In step (S14), it is determined whether or not the combustion catalyst reproducing gas (13) is ignited. If the determination is affirmative, the process proceeds to step (S15). If the determination in step (S14) is negative, the process proceeds to step (S16).

In step (S16), the energization to the igniter (9) is started again, and then, the process proceeds to step (S17).

In step (S17), the re-igniting gas (15) is produced, and then, the process returns to step (S14).

In step (S16), it is determined whether or not the reproduction end condition of the combustion catalyst (2) is established. If the determination is affirmative, the process proceeds to step (S18).

The reproduction end condition of the combustion catalyst (2) is established when the inlet temperature of the combustion catalyst (2) is equal to or higher than a predetermined value for a predetermined period of time.

In step (S18), the reproduction of the combustion catalyst (2) is ended, and thus, the process comes to an end.

The reproduction of the combustion catalyst (2) is ended by stopping the production of the combustion catalyst reproducing gas (13). Incidentally, in the case where the ignition status detector (14) detects the ignition of the re-igniting gas (15) after the energization to the igniter (9) in step (S16) is started again, the energization to the igniter (9) may be ended. Without the heat generation by the igniter (9), the combustion flame of the re-igniting gas (15) is taken over to the combustion catalyst reproducing gas (13), and thus, the flame combustion is continued.

What is claimed is:
1. An exhaust gas processing device for an engine comprising:
   a combustible gas producer, a combustion catalyst, an exhaust processing unit, and a control unit, the exhaust gas processing device being configured such that a combustion catalyst burning gas is produced by the combustible gas producer under the control of the control unit, the resultant combustion catalyst burning gas is mixed with an exhaust gas passing an engine exhaust gas channel and catalytically burned with the combustion catalyst, and then, the exhaust gas whose temperature is increased by catalyst combustion is supplied to the exhaust processing unit,
   wherein the control unit allows the combustible gas producer to produce a combustion catalyst warming gas before the combustion catalyst burning gas is produced, the resultant combustion catalyst warming gas is mixed with the exhaust gas passing the engine exhaust gas channel and ignited by an igniter disposed upstream of the combustion catalyst that is thus warmed with the exhaust gas whose temperature is increased by flame combustion;
   the combustion catalyst burning gas is produced in the case where a warming end condition for the combustion catalyst is established; and
   the establishment of the warming end condition for the combustion catalyst signifies the establishment of either one of a first condition or a second condition: the first condition in which an inlet temperature of the combustion catalyst is equal to or higher than an activation requirement temperature of the combustion catalyst, and further, an outlet temperature of the combustion catalyst is equal to or higher than an activation confirmation temperature of the combustion catalyst in excess of the inlet temperature of the combustion catalyst; and the second condition in which the outlet temperature of the combustion catalyst exceeds a warming confirmation temperature of the combustion catalyst that is set to be higher as an engine speed is lower, for a predetermined period of time.

2. The exhaust gas processing device for an engine according to claim 1, wherein a target reaction temperature of a gas production catalyst in the combustible gas producer is set to be higher in the case where the combustion catalyst warming gas is produced than in the case where the combustion catalyst burning gas is produced, so that the ignition quality of the combustion catalyst warming gas is more enhanced than that of the combustion catalyst burning gas.

3. The exhaust gas processing device for an engine according to claim 2, wherein the combustible gas producer is provided with a heater, and the control unit allows the gas production catalyst to be warmed by heat generated by the heater before the combustion catalyst warming gas is produced with the gas production catalyst, and
   the energization to the heater is ended after a lapse of a predetermined period of time after the energization to the heater is started: in contrast, the control unit allows the igniter to be started to be energized before the ending, so that the igniter is pre-heated before the combustion catalyst warming gas is produced.

4. The exhaust gas processing device for an engine according to claim 3, further comprising a PM accumulation amount estimator for the combustion catalyst,
   wherein in the case where a predetermined combustion catalyst reproduction requirement condition is satisfied based on a PM accumulation estimation value of the combustion catalyst, the control unit allows the combustible gas producer to produce a combustion catalyst reproducing gas, the resultant combustion catalyst reproducing gas is mixed with the exhaust gas passing the engine exhaust gas channel and is ignited by the igniter, and PM accumulated on the combustion catalyst is burned and removed with the exhaust gas whose temperature is increased by the flame combustion, thus reproducing the combustion catalyst.

5. The exhaust gas processing device for an engine according to claim 4, further comprising an ignition status detector for the igniter,
 wherein the control unit allows the combustible gas producer to produce a re-igniting gas in the case where the ignition status detector detects that the combustion catalyst reproducing gas is not ignited, and a target reaction temperature of the gas production catalyst in the combustible gas producer in the case where the re-igniting gas is produced is set to be higher than that in the case where the combustion catalyst reproducing gas is produced, so that the ignition quality of the re-igniting gas is more enhanced than that of the combustion catalyst reproducing gas.

6. The exhaust gas processing device for an engine according to claim 2, further comprising a PM accumulation amount estimator for the combustion catalyst,
 wherein in the case where a predetermined combustion catalyst reproduction requirement condition is satisfied based on a PM accumulation estimation value of the combustion catalyst, the control unit allows the combustible gas producer to produce a combustion catalyst reproducing gas, the resultant combustion catalyst reproducing gas is mixed with the exhaust gas passing the engine exhaust gas channel and is ignited by the igniter, and PM accumulated on the combustion catalyst is burned and removed with the exhaust gas whose temperature is increased by the flame combustion, thus reproducing the combustion catalyst.

7. The exhaust gas processing device for an engine according to claim 6, further comprising an ignition status detector for the igniter,
 wherein the control unit allows the combustible gas producer to produce a re-igniting gas in the case where the ignition status detector detects that the combustion catalyst reproducing gas is not ignited, and a target reaction temperature of the gas production catalyst in the combustible gas producer in the case where the re-igniting gas is produced is set to be higher than that in the case where the combustion catalyst reproducing gas is produced, so that the ignition quality of the re-igniting gas is more enhanced than that of the combustion catalyst reproducing gas.

8. The exhaust gas processing device for an engine according to claim 1, further comprising a PM accumulation amount estimator for the combustion catalyst,
 wherein in the case where a predetermined combustion catalyst reproduction requirement condition is satisfied based on a PM accumulation estimation value of the combustion catalyst, the control unit allows the combustible gas producer to produce a combustion catalyst reproducing gas, the resultant combustion catalyst reproducing gas is mixed with the exhaust gas passing the engine exhaust gas channel and is ignited by the igniter, and PM accumulated on the combustion catalyst is burned and removed with the exhaust gas whose temperature is increased by the flame combustion, thus reproducing the combustion catalyst.

9. The exhaust gas processing device for an engine according to claim 8, further comprising an ignition status detector for the igniter,
 wherein the control unit allows the combustible gas producer to produce a re-igniting gas in the case where the ignition status detector detects that the combustion catalyst reproducing gas is not ignited, and a target reaction temperature of the gas production catalyst in the combustible gas producer in the case where the re-igniting gas is produced is set to be higher than that in the case where the combustion catalyst reproducing gas is produced, so that the ignition quality of the re-igniting gas is more enhanced than that of the combustion catalyst reproducing gas.

\* \* \* \* \*